(12) United States Patent
Nagata (10) Patent No.: US 11,233,588 B2
(45) Date of Patent: Jan. 25, 2022

(54) DEVICES, SYSTEMS AND METHODS FOR DETERMINING A PROXIMITY OF A PERIPHERAL BLE DEVICE

(71) Applicant: TOYOTA MOTOR ENGINEERING & MANUFACTURING NORTH AMERICA, INC., Plano, TX (US)

(72) Inventor: Katsumi Nagata, Foster City, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/701,859

(22) Filed: Dec. 3, 2019

(65) Prior Publication Data
US 2021/0167872 A1    Jun. 3, 2021

(51) Int. Cl.
| H04B 17/27 | (2015.01) |
| H04B 17/318 | (2015.01) |
| H04W 8/00 | (2009.01) |
| H04W 4/80 | (2018.01) |

(52) U.S. Cl.
CPC .......... *H04B 17/27* (2015.01); *H04B 17/318* (2015.01); *H04W 4/80* (2018.02); *H04W 8/005* (2013.01)

(58) Field of Classification Search
CPC ........ H04B 17/27–17/318; H04W 4/80–8/005
See application file for complete search history.

(56) References Cited

U.S. PATENT DOCUMENTS

| 8,520,586 B1* | 8/2013 | Husted ................ H04W 52/367 370/318 |
| 9,066,327 B2 | 6/2015 | Liu |
| 9,253,674 B2 | 2/2016 | Rosener |
| 9,609,464 B2 | 3/2017 | Knaappila et al. |
| 10,013,831 B1* | 7/2018 | Kusens ............... G06F 16/9535 |
| 10,142,823 B2 | 11/2018 | Fu et al. |
| 10,194,278 B1* | 1/2019 | Kusens ................. G06F 16/23 |
| 10,230,596 B2 | 3/2019 | Vandwalle et al. |
| 10,264,396 B2* | 4/2019 | Hsu ...................... H04W 4/023 |
| 10,674,317 B2* | 6/2020 | Arunachalam .......... G01S 1/68 |
| 2003/0083015 A1* | 5/2003 | Palin ..................... H04W 8/005 455/67.11 |
| 2009/0011713 A1* | 1/2009 | Abusubaih ............ G01S 11/02 455/67.11 |
| 2010/0135178 A1* | 6/2010 | Aggarwal ................ G01S 5/14 370/252 |

(Continued)

*Primary Examiner* — Gennadiy Tsvey
(74) *Attorney, Agent, or Firm* — Dinsmore & Shohl LLP (57) ABSTRACT

Systems, devices, and methods are disclosed. A device includes one or more processors and one or more non-transitory memory modules storing machine-readable instructions that, when executed, cause the one or more processors to receive a plurality of Bluetooth low energy (BLE) signals from a plurality of peripheral devices, and, for each of the plurality of peripheral devices, determine a count of the BLE signals received within a period of time. When executed, the machine-readable instructions cause the one or more processors to determine a threshold count value based on the count of each of the plurality of peripheral devices, and determine a proximity of the plurality of peripheral devices with respect to the device based on a comparison of the count of each of the plurality of peripheral devices and the threshold count value.

15 Claims, 4 Drawing Sheets

(56) References Cited

U.S. PATENT DOCUMENTS

| | | | |
|---|---|---|---|
| 2011/0149799 A1* | 6/2011 | Wu | H04W 8/005 |
| | | | 370/254 |
| 2011/0269479 A1* | 11/2011 | Ledlie | G01S 11/06 |
| | | | 455/456.1 |
| 2012/0220376 A1* | 8/2012 | Takayama | H04L 67/38 |
| | | | 463/42 |
| 2013/0143590 A1* | 6/2013 | Sridhara | G01S 5/0252 |
| | | | 455/456.1 |
| 2014/0357192 A1 | 12/2014 | Azogui et al. | |
| 2015/0119016 A1* | 4/2015 | Palin | H04W 76/27 |
| | | | 455/418 |
| 2015/0131460 A1* | 5/2015 | Sridhara | G01S 11/06 |
| | | | 370/252 |
| 2015/0237515 A1* | 8/2015 | Park | G06Q 30/02 |
| | | | 455/405 |
| 2015/0245194 A1* | 8/2015 | Kim | H04W 8/005 |
| | | | 455/41.1 |
| 2015/0271632 A1* | 9/2015 | Venkatraman | G01S 5/02 |
| | | | 455/456.2 |
| 2016/0218804 A1* | 7/2016 | Raj | H04B 10/1149 |
| 2016/0270023 A1* | 9/2016 | Ashizuka | H04W 64/003 |
| 2016/0301485 A1* | 10/2016 | Saitou | H04W 52/0238 |
| 2017/0188188 A1* | 6/2017 | Kang | H04L 61/6022 |
| 2017/0357788 A1* | 12/2017 | Ledvina | G06F 21/35 |
| 2018/0054842 A1* | 2/2018 | Kandagadla | H04W 76/14 |
| 2020/0146084 A1* | 5/2020 | Boushley | H04W 8/005 |

\* cited by examiner

| PERIPHERAL DEVICE | Avg. RSSI (dB) | COUNTER VALUE | RSSI RANKING | FILTER BY COUNTER VALUE | COUNTER VALUE RANKING |
|---|---|---|---|---|---|
| 20-1 | -78 | 1 | 5 | X | - |
| 20-2 | -76 | 28 | 2 | O | 2 |
| 20-3 | -85 | 1 | 6 | X | - |
| 20-4 | -80 | 15 | 4 | X | - |
| 20-5 | -80 | 21 | 3 | O | 3 |
| 20-6 | -76 | 34 | 1 | O | 1 |

| RSSI THRESHOLD | -85 dB |
|---|---|

| THRESHOLD COUNTER VALUE | 16.67 |
|---|---|

FIG. 4

DEVICES, SYSTEMS AND METHODS FOR DETERMINING A PROXIMITY OF A PERIPHERAL BLE DEVICE

TECHNICAL FIELD

The present specification generally relates to devices, systems, and methods for determining a proximity of a peripheral Bluetooth low energy (BLE) device and, more particularly, to devices, systems, and methods for determining a proximity of a peripheral BLE device relative to a host device.

BACKGROUND

A host device and a peripheral device may communicate using various wireless communication protocols. As a non-limiting example, a host device and a peripheral device may communicate using Bluetooth low energy (BLE) signals, which are Bluetooth signals that enable reduced power consumption and increased communication ranges compared to prior Bluetooth signal specifications. Furthermore, a host device may determine a proximity of a peripheral device with respect to the host device based on a received signal strength indicator (RSSI) of a BLE signal received from the peripheral device. However, noise from the surrounding environment may prevent the host device from accurately determining the proximity of the peripheral device.

Accordingly, a need exists for peripheral device proximity detection devices, systems, and methods that accurately determines the proximity of a plurality of peripheral device relative to a host device.

SUMMARY

In one embodiment, a device is disclosed and includes one or more processors. The device includes one or more non-transitory memory modules storing machine-readable instructions that, when executed, cause the one or more processors to receive a plurality of Bluetooth low energy (BLE) signals from a plurality of peripheral devices, and, for each of the plurality of peripheral devices, determine a count of the BLE signals received within a period of time. When executed, the machine-readable instructions cause the one or more processors to determine a threshold count value based on the count of each of the plurality of peripheral devices, and determine a proximity of the plurality of peripheral devices with respect to the device based on a comparison of the count of each of the plurality of peripheral devices and the threshold count value.

In another embodiment, a method is disclosed and includes receiving, using one or more processors of a host device, a plurality of Bluetooth low energy (BLE) signals from a plurality of peripheral devices. The method includes, for each of the plurality of peripheral devices, determining, using the one or more processors, a count of the BLE signals received within a period of time. The method includes determining, using the one or more processors, a threshold count value based on the count of each of the plurality of peripheral devices. The method includes determining, using the one or more processors, a proximity of the plurality of peripheral devices with respect to the host device based on a comparison of the count of each of the plurality of peripheral devices and the threshold count value.

In yet another embodiment, a system includes a plurality of peripheral devices and a host device. The host device includes one or more processors and one or more non-transitory memory modules, the one or more non-transitory memory modules storing machine-readable instructions that, when executed, cause the one or more processors to receive a plurality of Bluetooth low energy (BLE) signals from a plurality of peripheral devices, and, for each of the plurality of peripheral devices, determine a count of the BLE signals received within a period of time. When executed, the machine-readable instructions cause the one or more processors to determine a threshold count value based on the count of each of the plurality of peripheral devices, and determine a proximity of the plurality of peripheral devices with respect to the device based on a comparison of the count of each of the plurality of peripheral devices and the threshold count value.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are generally related to peripheral device proximity detection devices, systems, and methods that determine a proximity of a plurality of peripheral devices relative to a host device based on a frequency of BLE advertising signals received by the host device during a specified time interval. Furthermore, the peripheral device proximity detection devices, systems, and methods may determine a proximity of a plurality of peripheral devices relative to a host device based on an RSSI of BLE advertising signals received by the host device during the specified time interval. By utilizing the RSSI and frequency of BLE advertising signals during the specified time interval, the host device can more accurately determine the proximity of a plurality of peripheral devices relative to the host device in spite of the noise that may be present in the environment.

As used herein, the term "RSSI" refers to a power ratio in decibels (dBm) of a signal transmitted or received by one of a peripheral device and a host device. In some embodiments, a relatively strong RSSI generally indicates that a peripheral device is close to the host device, and a relatively weak RSSI generally indicates that a peripheral device is further away from the host device. It should be understood that that other units may be utilized to represent the power of a signal received by one of a peripheral device and a host device, such as a power spectral density of the message (dBm/MHz), a bit error rate (BER) of the message, a signal-to-noise ratio (SNR), a reference signal received quality (RSRQ), and/or the like.

As used herein, the phrase "BLE signal" refers to a Bluetooth low energy signal. While the embodiments of the present disclosure are provided in the context of a BLE signal, it should be understood that the embodiments described herein are applicable to other near field communication protocols, such as IrDA, Bluetooth®, Wireless USB, Z-Wave, ZigBee, ultra wide-band (UWB), and the like.

Figure 1:
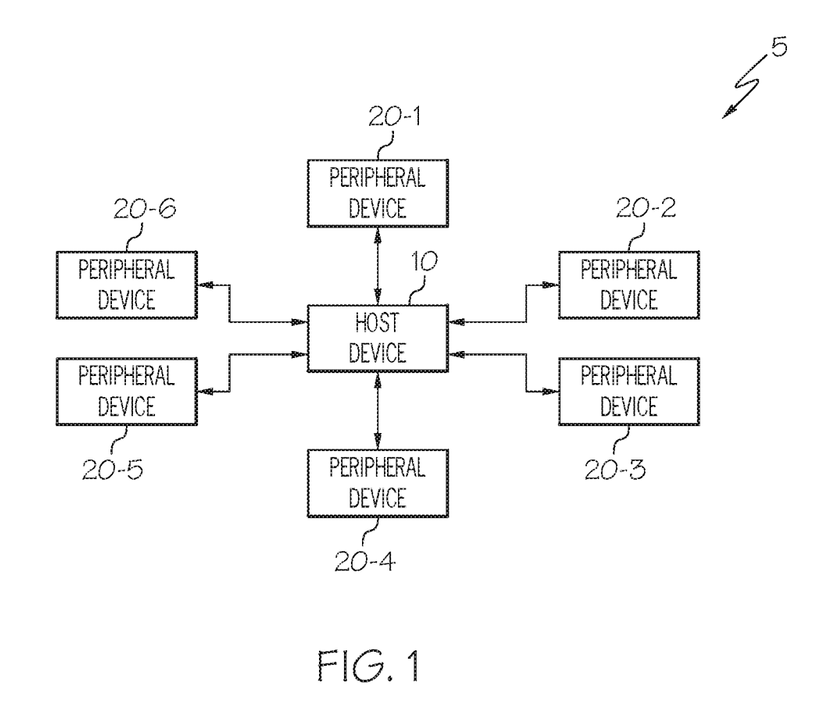
FIG. 1 schematically depicts a peripheral device proximity detection system including a host device and a plurality of peripheral devices according to one or more embodiments shown and described herein.

Referring now to FIG. 1, a proximity detection system 5 is schematically depicted. In embodiments, the proximity detection system 5 includes a host device 10, a first peripheral device 20-1, a second peripheral device 20-2, a third peripheral device 20-3, a fourth peripheral device 20-4, a fifth peripheral device 20-5, and a sixth peripheral device 20-6 (referred to as the peripheral device 20 when a generic one of the peripheral devices is discussed, and collectively referred to as the plurality of peripheral devices 20 when multiple peripheral devices are discussed without specific reference to particular peripheral devices).

Each of the host device 10 and the plurality of peripheral devices 20 may be any electronic device configured to communicate using various wireless communication protocols. As a non-limiting example, any of the host device 10 and the plurality of peripheral devices 20 may be one of a mobile device, a smartphone, a laptop, a desktop computing device, a portable digital assistant, a tablet, a smartwatch, a wireless beacon, and the like. The wireless communication protocols include at least one of a Bluetooth link, a Bluetooth low energy (BLE) link, a wireless fidelity (Wi-Fi) link, near field communication link, a cellular link, and the like.

In the illustrated embodiment of FIG. 1, the host device 10 may be a wireless beacon configured to transmit and receive BLE signals, and each of the plurality of peripheral devices 20 may be mobile devices configured to transmit and receive BLE signals. As described below in further detail with reference to FIGS. 3 and 4, the host device 10 may determine a proximity of each of the plurality of peripheral devices 20 based on a frequency of BLE advertising signals received by the host device 10 and an RSSI of the BLE advertising signals received by the host device 10 during a specified time interval.

Figure 2:
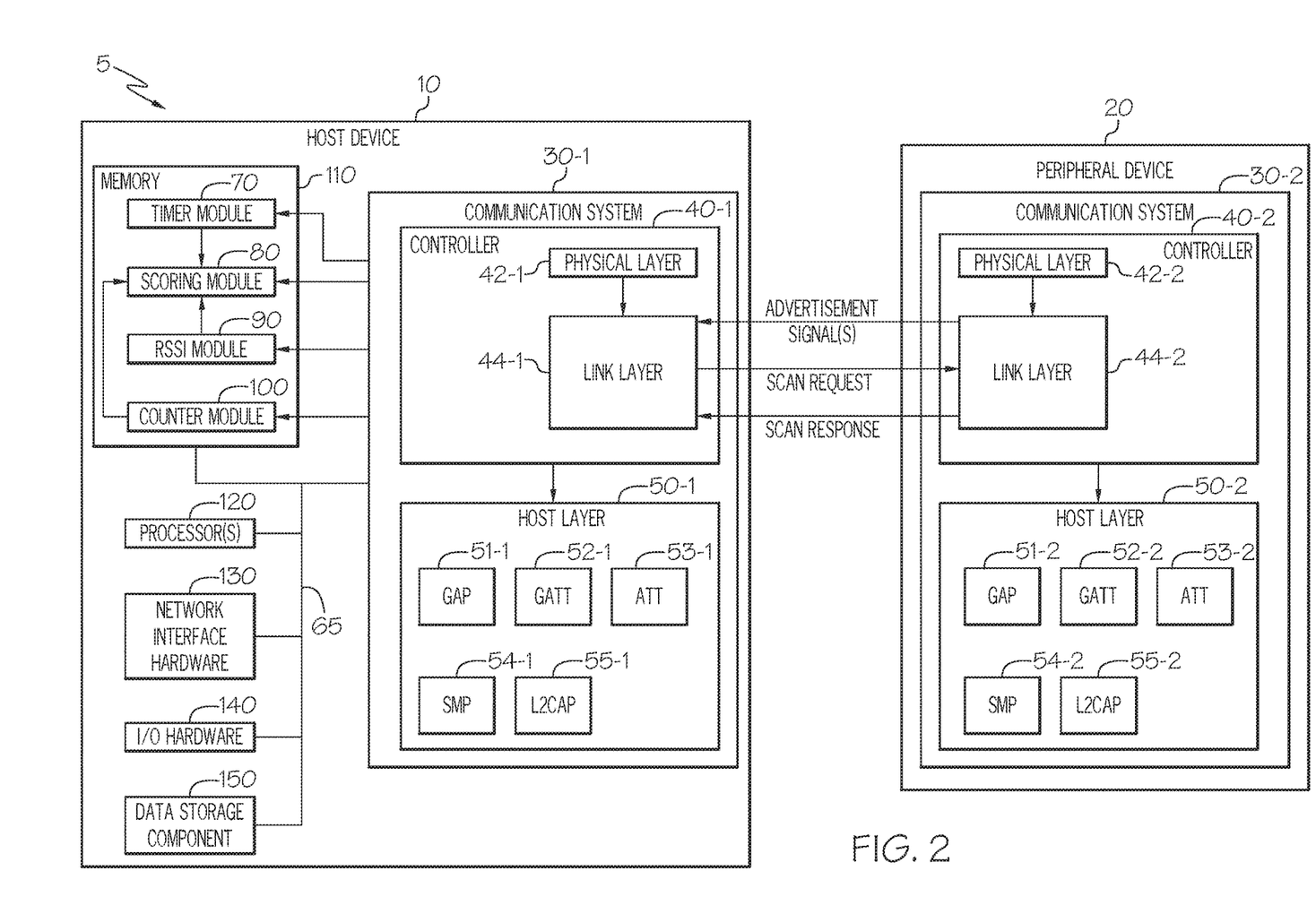
FIG. 2 schematically depicts a functional block diagram of a host device communicating with a peripheral device using a Bluetooth communication protocol according to one or more embodiments shown and described herein.

With reference to FIG. 2, a functional block diagram of the proximity detection system 5 including the host device 10 and the peripheral device 20 is schematically depicted. In some embodiments, the host device 10 includes a communication system 30-1, which includes a BLE controller 40-1, and a host layer 50-1. The BLE controller 40-1 includes a physical layer 42-1 and a link layer 44-1. The host layer 50-1 includes generic access profile (GAP) 51-1, a generic attribute protocol (GATT) 52-1, an attribute protocol (ATT) 53-1, a security manager protocol (SMP) 54-1, and a logical link control and adaptation protocol (L2CAP) 55-1. The host device 10 also includes a communication interface 65 and a memory module 110, which includes a timer module 70, a scoring module 80, an RSSI module 90, and a counter module 100. The host device 10 also includes one or more processors 120, network interface hardware 130, input/output (I/O) hardware 140, and a data storage component 150. It should be understood that the first communication system 30-1 also includes an application layer (not shown) in some embodiments.

In some embodiments, the peripheral device 20 includes a communication system 30-2, which includes a BLE controller 40-2, and a host layer 50-2. The BLE controller 40-2 includes a physical layer 42-2 and a link layer 44-2. The host layer 50-2 includes a GAP 51-2, a GATT 52-2, an ATT 53-2, a SMP 54-2, and an L2CAP 55-2. While not illustrated in FIG. 2, it should also be understood that the peripheral device includes a memory module, one or more processors, network interface hardware, I/O hardware, a data storage component, a communication interface, and an application layer in some embodiments.

As used herein, the communication system 30-1 and the communication system 30-2 are collectively referred to as the communication systems 30. As used herein, the BLE controller 40-1 and the BLE controller 40-2 are collectively referred to as BLE controllers 40. As used herein, the host layer 50-1 and the host layer 50-2 are collectively referred to as host layers 50. As used herein, the GAP 51-1 and the GAP 51-2 are collectively referred to as GAPs 51. As used herein, the GATT 52-1 and the GATT 52-2 are collectively referred to as GATTs 52. As used herein, the ATT 53-1 and the ATT 53-2 are collectively referred to as ATTs 53. As used herein, the SMP 54-1 and the SMP 54-2 are collectively referred to as SMPs 54. As used herein, the L2CAP 55-1 and the L2CAP 55-2 are collectively referred to as L2CAPs 55.

The physical layers 42 of the BLE controllers 40 include analog circuitry configured to transmit and receive BLE signals. As a non-limiting example, the physical layers 42 include a radio circuit configured to communicate on the 2.4 GHz ISM band. Furthermore, thirty seven channels of the 2.4 GHz ISM band may be dedicated to bidirectional communication between the host device 10 and the peripheral device 20 (e.g., channels 0-36 are dedicated for data communication), and three of the channels may be dedicated for device discovery (e.g., channels 37-39 are dedicated for the transmission/reception of BLE advertising signals). In some embodiments, the physical layers 42 may include a Gaussian frequency-shift keying (GFSK) circuit for filtering and modulating the BLE signals prior to transmission.

The various analog parameters and functions of the physical layers 42, such as adaptive frequency hopping, device discovery, connection establishment, and/or the like, may be controlled by the link layers 44 of the BLE controllers 40. Furthermore, the link layers 44 enable encryption and authentication of signals exchanged between the host device 10 and the peripheral device 20 by using, for example, a cipher block chaining-message authentication code (CCM) algorithm and a 128-bit AES block cipher. When encryption and authentication are used to connect the host device 10 and the peripheral device 20, a message integrity check (MIC) is appended to the payload of the data channel protocol data unit (PDU) of the signal transmitted by one of the host device 10 and the peripheral device 20. Subsequently, the PDU payload and MIC field are encrypted. It should be understood that various encryption and authentication methods may be utilized to connect the host device 10 and the peripheral device 20. It should also be understood that the host device 10 and the peripheral device 20 may exchange signals over an unencrypted link layer connection in some embodiments.

The GAPs 51 of the host layers 50 define a security mode of the respective device (e.g., no security, unauthenticated pairing with encryption, authenticated pairing with AES-CCM encryption, unauthenticated pairing with data signing, authenticated pairing with data signing, etc.). The GAPs 51 of the host layers 50 also define various operation modes of the respective device (e.g., a broadcaster mode, an observer mode, a peripheral mode, and/or a central mode).

The GATTs 52 of the host layers 50 define the data formatting mode (e.g., a server device that contains a characteristic database or a client device that reads/writes data), data packaging, and data transmission protocols between the host device 10 and the peripheral device 20. The ATTs 53 of the host layers 50 indicate whether the host device 10 and the peripheral device 20 functions a server device or a client device. In various embodiments, the L2CAPs 55 multiplex data of the ATTs 53, the SMPs 54, and the link layer 44.

The SMPs 54 execute a pairing function between the host device 10 and peripheral device 20. During the pairing function, encryption keys are generated and distributed, and the pairing function comprises three phases. As a non-limiting example, during the first phase, the host device 10 and the peripheral device 20 broadcast their input/output capabilities and select a suitable method for executing the second phase based on the input/output capabilities. During the second phase, the host device 10 and the peripheral device 20 exchange a temporary key (e.g., using an out-of-band protocol, passkey entry protocol, etc.) and subsequently generate a short-term key based on the random bit values of the temporary key. During the third phase, the host device 10 and the peripheral device 20 may exchange a plurality of 128-bit long-term keys, a connection signature-resolving key, and an identity-resolving key that are encrypted by the short-term key. The long-term key encrypts and authenticates the link layer 44. The connection signature-resolving key authenticates the data of the ATTs 53 and/or the GATTs 52, and the identity-resolving key generates a private address based on a public address of the host device 10 and the peripheral device 20.

In some embodiments, each of the one or more processors 120 may be any device capable of executing machine readable and executable instructions. Accordingly, each of the one or more processors 120 may be a controller, an integrated circuit, a microchip, a computer, or any other processing device. The one or more processors 120 are coupled to the communication interface 65 that provides signal interconnectivity between various modules of the host device 10. Accordingly, the communication interface 65 may communicatively couple any number of processors 120 with one another, and allow the modules coupled to the communication interface 65 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication interface 65 may be formed from any medium that is capable of transmitting a signal such as, for example, conductive wires, conductive traces, optical waveguides, or the like. In some embodiments, the communication interface 65 may facilitate the transmission of wireless signals, such as Wi-Fi, Bluetooth®, Near Field Communication (NFC) and the like. Moreover, the communication interface 65 may be formed from a combination of mediums capable of transmitting signals. In one embodiment, the communication interface 65 comprises a combination of conductive traces, conductive wires, connectors, and buses that cooperate to permit the transmission of electrical data signals to components such as processors, memories, sensors, input devices, output devices, and communication devices. As used herein, the term "signal" refers to a waveform (e.g., electrical, optical, magnetic, mechanical or electromagnetic), such as DC, AC, sinusoidal-wave, triangular-wave, square-wave, vibration, and the like, capable of traveling through a medium.

The memory module 110 is coupled to the communication interface 65 and comprises a non-transitory computer-readable medium, such as RAM, ROM, flash memories, hard drives, or any device capable of storing machine readable and executable instructions such that the machine readable and executable instructions can be accessed by the one or more processors 120. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the memory module 110. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, the network interface hardware 130 may include and/or communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The input/output hardware 140 may include a basic input/output system (BIOS) that interacts with hardware of the host device 10, device drivers that interact with particular devices of the host device 10, one or more operating systems, user applications, background services, background applications, etc. The data storage component 150 is communicatively coupled to the one or more processors 120. As a non-limiting example, the data storage component 150 may include one or more database servers that support NoSQL, MySQL, Oracle, SQL Server, NewSQL, or the like.

A description of the timer module 70, the scoring module 80, the RSSI module 90, and the counter module 100 of the memory 110 will now be provided.

The timer module 70 receives input from the first communication system 30-1 and generates a value indicating an amount of elapsed time, as described below in further detail with reference to FIG. 3.

The scoring module 80 receives input from the timer module 70, the RSSI module 90, and the counter module 100 and generates a score indicating a relative proximity of each of the plurality of peripheral devices 20 in relation to the host device 10, as described below in further detail with reference to FIG. 3.

The RSSI module 90 receives input from the first communication system 30-1 and determines an RSSI value of each of the BLE signals received from the plurality of peripheral devices 20 during a period of time, as described below in further detail with reference to FIG. 3.

The counter module 100 receives input from the first communication system 30-1 and determines a count of BLE signals received from the plurality of peripheral devices 20 during the period of time, as described below in further detail with reference to FIG. 3.

Figure 3:
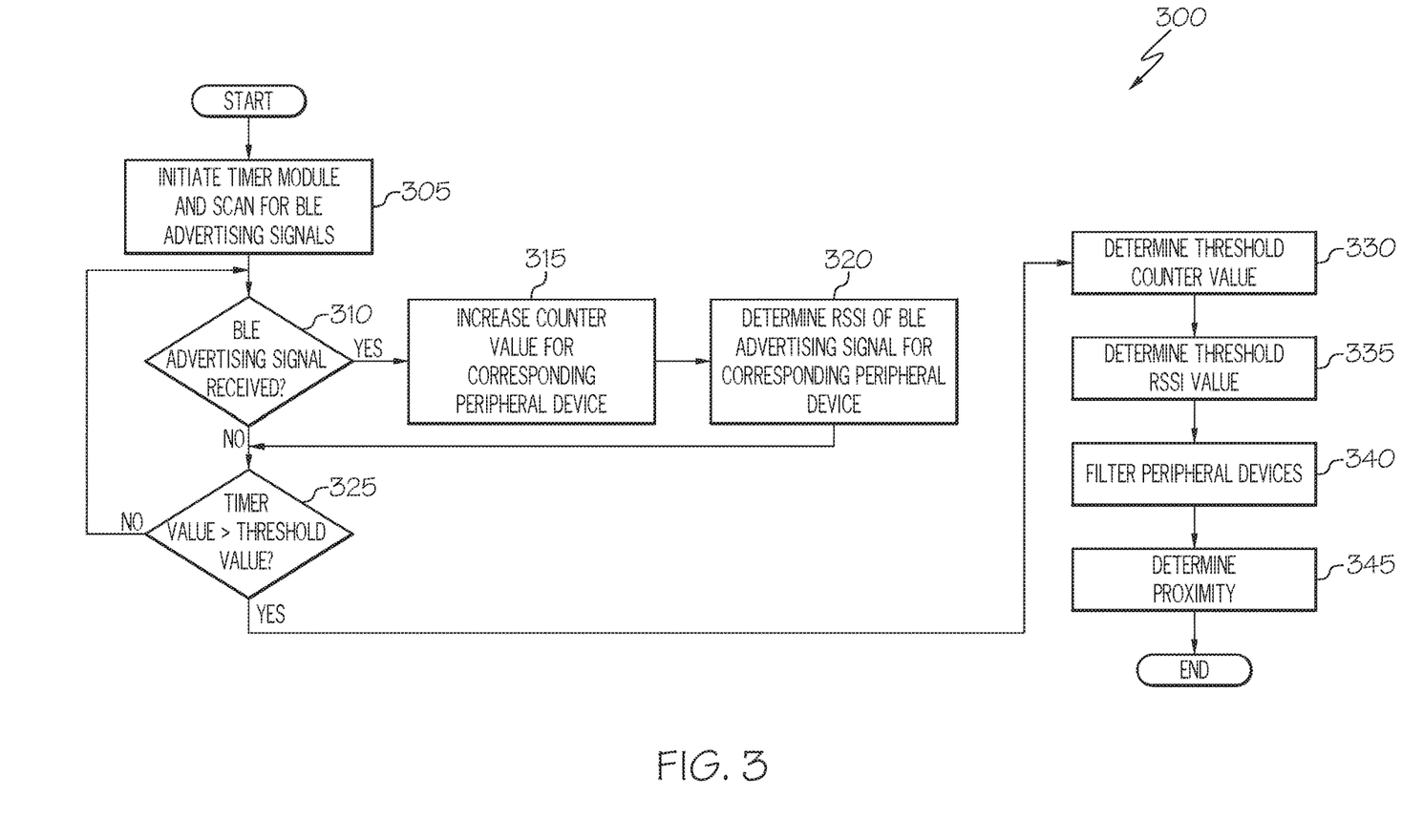
FIG. 3 depicts a flow diagram for determining a proximity of a plurality of peripheral devices relative to a host device according to one or more embodiments shown and described herein.

With reference to FIG. 3, a flow diagram illustrating an example method 300 for determining a proximity of the plurality of peripheral devices 20 relative to the host device is schematically depicted. The flow diagram elements described herein may be translated into machine-readable instructions. While the steps shown in FIG. 3 are shown as all occurring and in a particular order, in other embodiments one or more of the steps may not be performed, and in some embodiments, one or more of the steps may be performed in a different order as shown and described herein.

Referring to FIG. 3 in conjunction with FIGS. 1-2, at step 305, the host device 10 initiates the timer module 70 and scans for BLE advertising signals transmitted by the plurality of peripheral device 20. In some embodiments, the timer module 70 generates a value indicating an amount of time elapsed from the initiation of the timer module 70. Furthermore, the value of the timer module 70 may increase until the value reaches a threshold period of time, which may be based on one or more scanning intervals of the host device 10 (e.g., a period of time between successive advertising channels in which the host device 10 scans for BLE advertising signals, such as between 10 milliseconds to 10.24 seconds), one or more scanning windows of the host device 10 (e.g., a period of time in which the host device 10 scans for BLE advertising signals using one of the advertising channels, such as between 10 milliseconds to 10.24 seconds), and/or a scanning duration (e.g., a period of time in which the host device 10 remains in a scanning state, such as greater than 10 milliseconds).

As the value of the timer module 70 approaches the threshold period of time, the host device 10 scans for BLE advertising signals. In some embodiments, the BLE advertising signals includes up to 31 bytes of user configurable data. Furthermore, the BLE advertising signals may include an additional 31 bytes corresponding to scan response bytes in response to receiving a scan request from the host device 10, as shown in FIG. 2.

Still referring to FIG. 3 in conjunction with FIGS. 1-2, at step 310, the host device 10 determines whether a BLE advertising signal was received. If so (YES at step 310), the method 300 proceeds to step 315; otherwise (NO at step 310), the method 300 proceeds to step 325. Still referring to FIG. 3 in conjunction with FIGS. 1-2, at step 315, the counter module 100 increases a counter value for the corresponding peripheral device of the plurality of peripheral devices 20. The counter value indicates a number of BLE advertising signals received from a corresponding peripheral device of the plurality of peripheral devices 20 within the threshold period of time. Still referring to FIG. 3 in conjunction with FIGS. 1-2, at step 320, the RSSI module 90 determines the RSSI of each BLE advertising signal received from the corresponding peripheral device 20 by, for example, reading an RSSI packet of the payload of each of the BLE signals. Still referring to FIG. 3 in conjunction with FIGS. 1-2, at step 325, the timer module 70 determines whether the value of the timer is greater than the threshold period of time. If so (YES at block 325), the method proceeds to step 330; otherwise (NO at block 325), the method 300 returns to step 310.

Figure 4:
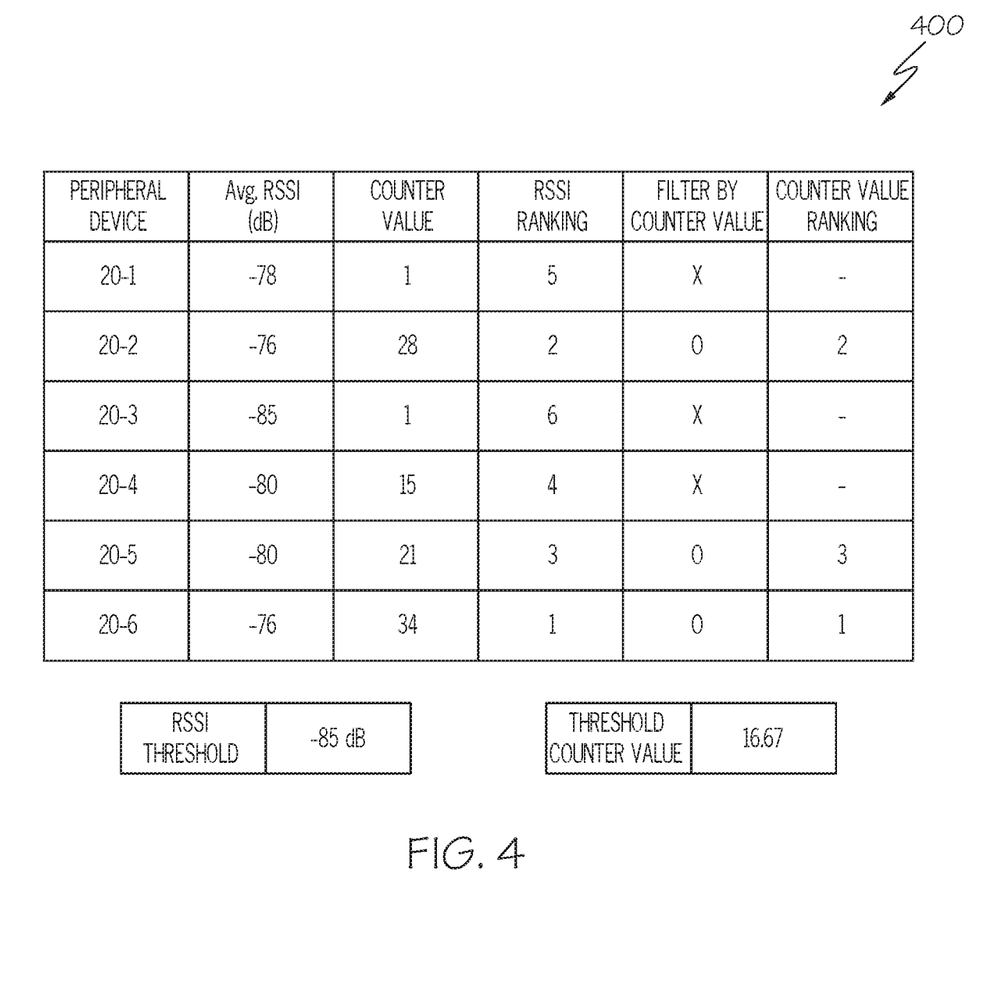
FIG. 4 schematically depicts a chart of a relative proximity of a plurality of peripheral devices to a host device according to one or more embodiments shown and described herein.

Referring to FIG. 3 in conjunction with FIGS. 1-2 and 4, at step 330, the scoring module 80 determines a threshold counter value. In some embodiments, the threshold counter value may represent one of an average of the count of each of the plurality of peripheral devices 20. As a non-limiting example and as shown in graph 400 of FIG. 4, the host device 10 receives, within the threshold period of time, one BLE advertising signal from the first peripheral device 20-1, twenty eight BLE advertising signals from the second peripheral device 20-2, one BLE advertising signal from the third peripheral device 20-3, fifteen BLE advertising signals from the fourth peripheral device 20-4, twenty one BLE advertising signals from the fifth peripheral device 20-5, and thirty four BLE advertising signals from the sixth peripheral device 20-6. Accordingly, the threshold counter value in this embodiment may be an average of one (1), twenty eight (28), one (1), fifteen (15), twenty one (21), and thirty four (34) (i.e., 16.67 BLE advertising signals). It should be understood that the threshold counter value may indicate various other mathematical representations of the count of each of the plurality of peripheral devices 20, such as a median of the BLE advertising signals, a minimum of the BLE advertising signals, a maximum of the BLE advertising signals, a predetermined number of advertising signals, and/or the like.

Still referring to FIG. 3 in conjunction with FIGS. 1-2 and 4, at step 335, the scoring module 80 determines a threshold RSSI value. In some embodiments, a threshold RSSI value may be predetermined based on the designs of BLE devices. The designs of BLE devices may set a RSSI predetermined value and emit the RSSI predetermined value to a host device such as the host device 10 such that the host device may estimate or measure the threshold RSSI value at a distance. As a non-limiting example and as shown in graph 400 of FIG. 4, the threshold RSSI value may be −85 dB. All of the peripheral devices 20 meet the threshold RSSI value in this example, as: the threshold RSSI value of the first peripheral device 20-1 is −78 dB; the threshold RSSI value of the second peripheral device 20-2 is −76 dB; the threshold RSSI value of the third peripheral device 20-3 is −85 dB; the threshold RSSI values of the fourth peripheral device 20-4 and the fifth peripheral device 20-5 are −80 dB; and the threshold RSSI value of the sixth peripheral device 20-6 is −76 dB. In some embodiments, the threshold RSSI value may represent an average RSSI of all BLE advertising signals received within the threshold period of time. In some embodiments, the threshold RSSI value may represent an aggregate average RSSI of BLE advertising signals received within the threshold period of time, and the aggregate average RSSI may be based on the average RSSI of BLE advertising signals received by each of the plurality of peripheral devices 20. It should be understood that the threshold RSSI value may indicate various other mathematical representations of the RSSI of BLE advertising signals, such as a median of the RSSI of the BLE advertising signals, a minimum of the RSSI of the BLE advertising signals, a maximum of the RSSI of the BLE advertising signals, and/or the like.

Still referring to FIG. 3 in conjunction with FIGS. 1-2 and 4, at step 340, the scoring module 80 filters the peripheral devices 20. In some embodiments, the scoring module 80 may select a set of the peripheral devices 20 having a counter value that is greater than the threshold counter value and/or an average RSSI value that is greater than the threshold RSSI value. As a non-limiting example and as shown in graph 400 of FIG. 4, the scoring module 80 may rank the peripheral devices 20 based on the average RSSI values for the peripheral devices 20. Specifically, the scoring module 80 may rank the sixth peripheral device 20-6 as the first, the second peripheral device 20-2 as the second, the fifth peripheral device 20-5 as the third, the fourth peripheral device 20-4 as the fourth, the first peripheral device 20-1 as the fifth, and the third peripheral device 20-3 as the sixth. Then, the scoring module 80 may select a set of the peripheral devices 20 comprising the second peripheral device 20-2, the fifth peripheral device 20-5, and the sixth peripheral device 20-6, as each peripheral device in the set includes a counter value that is greater than the threshold counter value. The final ranking after filtering based on the threshold counter value may follow the order of the ranking based on the average RSSI ranking. That is, the sixth peripheral device 20-6 may be the first, the second peripheral device 20-2 may be the second, and the fifth peripheral device 20-5 may be the third Still referring to FIG. 3 in conjunction with FIGS. 1-2 and 4, at step 345, the scoring module 80 determines the relative proximity of the set of peripheral devices by ranking each peripheral device of the set of the plurality of peripheral devices 20. In some embodiments, the scoring module 80 ranks the set of the plurality of peripheral devices 20 by an average RSSI value and/or a counter value. In some embodiments, one of the average RSSI value and the counter value may be weighted prior to generating a ranking of each peripheral device of the set of the plurality of peripheral devices 20. Subsequently, the scoring module 80 may determine a proximity of at least the set of the plurality of peripheral devices 20 based on the relative ranking.

As a non-limiting example and as shown in graph 400 of FIG. 4, the scoring module 80 selects the set of the peripheral devices 20 as comprising the second peripheral device 20-2, the fifth peripheral device 20-5, and the sixth peripheral device 20-6, as described above. Furthermore, the scoring module 80 determines that the sixth peripheral device 20-6 has the highest counter value of the set, the second peripheral device 20-2 has the second highest counter value of the set, and the fifth peripheral device 20-5 has the fifth highest counter value of the set. Accordingly, the scoring module 80 may determine that the sixth peripheral device 20-6 is closest to the host device 10, the second peripheral device 20-2 is the next closest peripheral device to the host device 10, the fifth peripheral device 20-5 is the next closest peripheral device to the host device 10, and so on. The method 300 then ends.

It should now be understood that embodiments of the present disclosure are directed to a proximity detection system 5 that determines a proximity of the plurality of peripheral devices 20 relative to the host device 10 based on a frequency of BLE advertising signals received by the host device during a specified time interval. Furthermore and as described above, the proximity detection system 5 may determine a proximity of the plurality of peripheral devices 20 relative to the host device 10 based on an RSSI of BLE advertising signals received by the host device 10 during the specified time interval. By utilizing the RSSI and frequency of BLE advertising signals during the specified time interval, the host device 10 can more accurately determine the proximity of the plurality of peripheral devices 20 relative to the host device 10 in spite of the noise that may be present in the environment.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A device comprising:
a controller programmed to:
receive a plurality of Bluetooth low energy (BLE) signals from a plurality of peripheral devices;
for each of the plurality of peripheral devices, determine an average received signal strength indicator (RSSI) of the BLE signals received within a period of time;
for each of the plurality of peripheral devices, determine a count of the BLE signals received within the period of time;
determine a threshold count value based on the counts only for those peripheral devices from the plurality of peripheral devices that have the average RSSI of the BLE signals greater than a predetermined RSSI threshold;
select a subset of the plurality of peripheral devices, wherein the count of each peripheral device of the subset of the plurality of peripheral devices is greater than the threshold count value; and
determine a proximity of the subset of the plurality of peripheral devices with respect to the device based on the count of each of the subset of the plurality of peripheral devices.

2. The device of claim 1, wherein the threshold count value is an average of the count of each of the plurality of peripheral devices.

3. The device of claim 2, wherein the controller is programmed to:
rank each peripheral device of the subset of the plurality of peripheral devices based on the count of each peripheral device of the subset.

4. The device of claim 1, wherein the predetermined RSSI threshold is predetermined based on designs of the plurality of peripheral devices.

5. The device of claim 1, wherein the controller is programmed to:
receive the predetermined RSSI threshold from the plurality of peripheral devices.

6. A method comprising:
receiving, using one or more processors of a host device, a plurality of Bluetooth low energy (BLE) signals from a plurality of peripheral devices;
for each of the plurality of peripheral devices, determining an average received signal strength indicator (RSSI) of the BLE signals received within a period of time;
for each of the plurality of peripheral devices, determining, using the one or more processors, a count of the BLE signals received within the period of time;
determining, using the one or more processors, a threshold count value based on the counts only for those peripheral devices from the plurality of peripheral devices that have the average RSSI of the BLE signals greater than a predetermined RSSI threshold;

select a subset of the plurality of peripheral devices, wherein the count of each peripheral device of the subset of the plurality of peripheral devices is greater than the threshold count value; and determining, using the one or more processors, a proximity of the subset of the plurality of peripheral devices with respect to the host device based on the count of each of the subset of the plurality of peripheral devices.

7. The method of claim 6, wherein the threshold count value is an average of the count of each of the plurality of peripheral devices.

8. The method of claim 7, wherein determining the proximity of the subset of the plurality of peripheral devices based on the count of each of the subset of the plurality of peripheral devices further comprises:

ranking, using the one or more processors, each peripheral device of the subset of the plurality of peripheral devices based on the count of each peripheral device of the subset.

9. The method of claim 6, wherein the predetermined RSSI threshold is predetermined based on designs of the plurality of peripheral devices.

10. The method of claim 6, further comprising:
receiving the predetermined RSSI threshold from the plurality of peripheral devices.

11. A system comprising:
a plurality of peripheral devices;
a host device programmed to:
receive a plurality of Bluetooth low energy (BLE) signals from the plurality of peripheral devices;
for each of the plurality of peripheral devices, determine an average received signal strength indicator (RSSI) of the BLE signals received within a period of time;

for each of the plurality of peripheral devices, determine a count of the BLE signals received within the period of time;

determine a threshold count value based on the counts only for those peripheral devices from the plurality of peripheral devices that have the average RSSI of the BLE signals greater than a predetermined RSSI threshold;

select a subset of the plurality of peripheral devices, wherein the count of each peripheral device of the subset of the plurality of peripheral devices is greater than the threshold count value; and determine a proximity of the subset of the plurality of peripheral devices with respect to the host device based on the count of each of the subset of the plurality of peripheral devices.

12. The system of claim 11, wherein the threshold count value is an average of the count of each of the plurality of peripheral devices.

13. The system of claim 12, wherein the host device is programmed to:
rank each peripheral device of the subset of the plurality of peripheral devices based on the count of each peripheral device of the subset.

14. The system of claim 11, wherein the predetermined RSSI threshold is predetermined based on designs of the plurality of peripheral devices.

15. The system of claim 11, wherein the host device is programmed to:
receive the predetermined RSSI threshold from the plurality of peripheral devices.

* * * * *